United States Patent [19]

Maruyama et al.

[11] 3,911,495

[45] Oct. 7, 1975

[54] CASSETTE TAPE PLAYER START-UP MECHANISM

[75] Inventors: Yoshio Maruyama; Akihiro Fushimi, both of Kawagoe, Japan

[73] Assignee: Pioneer Electronic Corporation, Tokyo, Japan

[22] Filed: June 13, 1973

[21] Appl. No.: 369,645

[30] Foreign Application Priority Data

June 15, 1972 Japan ............................... 47-59857

[52] U.S. Cl. ...................... 360/96; 360/93; 242/198

[51] Int. Cl.$^2$ ........................................... G11B 15/24

[58] Field of Search ........... 360/93, 94, 96; 242/198

[56] References Cited

UNITED STATES PATENTS

| | | | |
|---|---|---|---|
| 3,560,126 | 2/1971 | Lear | 360/93 |
| 3,627,185 | 12/1971 | Trammell | 360/93 |
| 3,638,953 | 2/1972 | Kodama et al. | 360/96 |
| 3,656,704 | 4/1972 | Ogura | 360/96 |
| 3,666,208 | 5/1972 | Beretta | 360/96 |

*Primary Examiner*—Bernard Konick
*Assistant Examiner*—Stewart Levy
*Attorney, Agent, or Firm*—Sughrue, Rothwell, Mion, Zinn & Macpeak

[57] ABSTRACT

A cassette tape player includes an electric motor to rotate a capstan and a take-up reel shaft, a magnetic head, and a pinch roller, wherein the magnetic head and pinch roller are forced to oppose and contact the cassette tape by the inertia of a fly-wheel formed integrally with the capstan.

5 Claims, 5 Drawing Figures

CASSETTE TAPE PLAYER START-UP MECHANISM

BACKGROUND OF THE INVENTION

This invention relates to a cassette tape player used for reproduction of a cassette tape and, more particularly, to a cassette tape player of the type wherein an electric motor for driving a capstan and a take-up reel shaft is energized for reproduction of an inserted tape cassette.

In a conventional cassette tape player, when the tape cassette is inserted in the player and is ready for reproduction, a motor for driving a capstan and a take-up reel shaft is energized, and, at the same time, a carriage supporting a magnetic head and a pinch roller is moved so as to bring the magnetic head and the pinch roller close to the tape cassette. Thus, since the pinch roller is forced into contact with the tape before the capstan reaches its operating rate of revolution and reproduction may be started before the cassette tape reaches its normal feed rate, an unstable reproduction operation may result. Furthermore, in order to put the above type cassette tape player in the play condition, complicated mechanisms are required, and a strong actuating force produced manually or by use of a solenoid is needed.

Further, in a tape player of the type which starts up automatically in response to insertion of a tape cassette, such as are commonly incorporated in a car stereophonic player, a carriage to move a magnetic head and a pinch roller is biased in a position in which the magnetic head and pinch roller are close to the tape, and at the time of exchange of tape cassettes, the carriage is locked in a position spaced from the tape cassette. This locking of the carriage can be released in the course of the tape cassette being set in a predetermined play position. According to the above arrangement, if a normal smooth insertion operation is conducted, movement of the carriage ends when the tape cassette is put in the predetermined play position, and the magnetic head and pinch roller enter a window of the tape cassette; however, if an unsmooth insertion operation is conducted, the carriage starts to move before the tape cassette reaches the predetermined play position, and the magnetic head or pinch roller strikes against the edge of the window in the tape cassette, resulting in damage.

The present invention has been worked out in view of the afore-mentioned drawbacks of the prior art, and it is a first object of the present invention to provide an arrangement in which, by use of the inertia of a fly-wheel driven by a motor, a pinch roller and a magnetic head are moved to a play position.

It is a second object of the present invention to prevent both reproduction at the time of start-up of the motor and collision of the pinch roller and magnetic head with the tape cassette by moving the pinch roller and magnetic head to the play position only after the fly-wheel reaches substantially its operating rate of revolution.

It is a third object of the present invention to provide an arrangement of the cassette tape player in which a magnetic head and a pinch roller are moved to a play position by action of a fly-wheel after the fly-wheel is given a sufficient inertia to obviate start-up disturbances to the tape motion.

It is a fourth object of the present invention to provide a simple mechanism, adapted to be applied to a self-start-up cassette tape player, in which the inertia force of a fly-wheel is used to move a magnetic head and a pinch roller to a play position.

SUMMARY OF THE INVENTION

According to the present invention, there is provided a novel cassette tape player having an improved arrangement by which collision of a pinch roller and a magnetic head with a tape cassette will be prevented effectively and start-up of a rotary mechanism will be conducted smoothly.

In one preferred embodiment of the present invention, a cassette tape player comprises a holder mechanism for holding a tape cassette in a predetermined play position, a switch for connecting an electric motor to a power source when the tape cassette is set in the play position, a capstan driven by the motor, a fly-wheel rotated together with the capstan, a carriage movable between a first carriage position and a second carriage position so that a magnetic head comes close to and is spaced away from the tape cassette positioned in the play position and is biased so as to assume the first carriage position, a pin provided on the carriage, and a cam for maintaining the pin in such a manner that the carriage assumes the second carriage position, wherein the cam has an abutting face located on the moving path of the pin and an engaging portion coming onto the rotation path of a projection provided on the fly-wheel, the position of the engaging portion being selected so that when the engaging portion is pushed out of the rotation path of the projection due to engagement therebetween the engaging portion rotates the cam to cause the abutting face to go out of the moving path of the pin.

In another embodiment, two cams are used to maintain the pin provided on the carriage in such a manner that the carriage assumes the second carriage position.

DESCRIPTION OF THE PREFERRED EMBODIMENT

Figure 1:
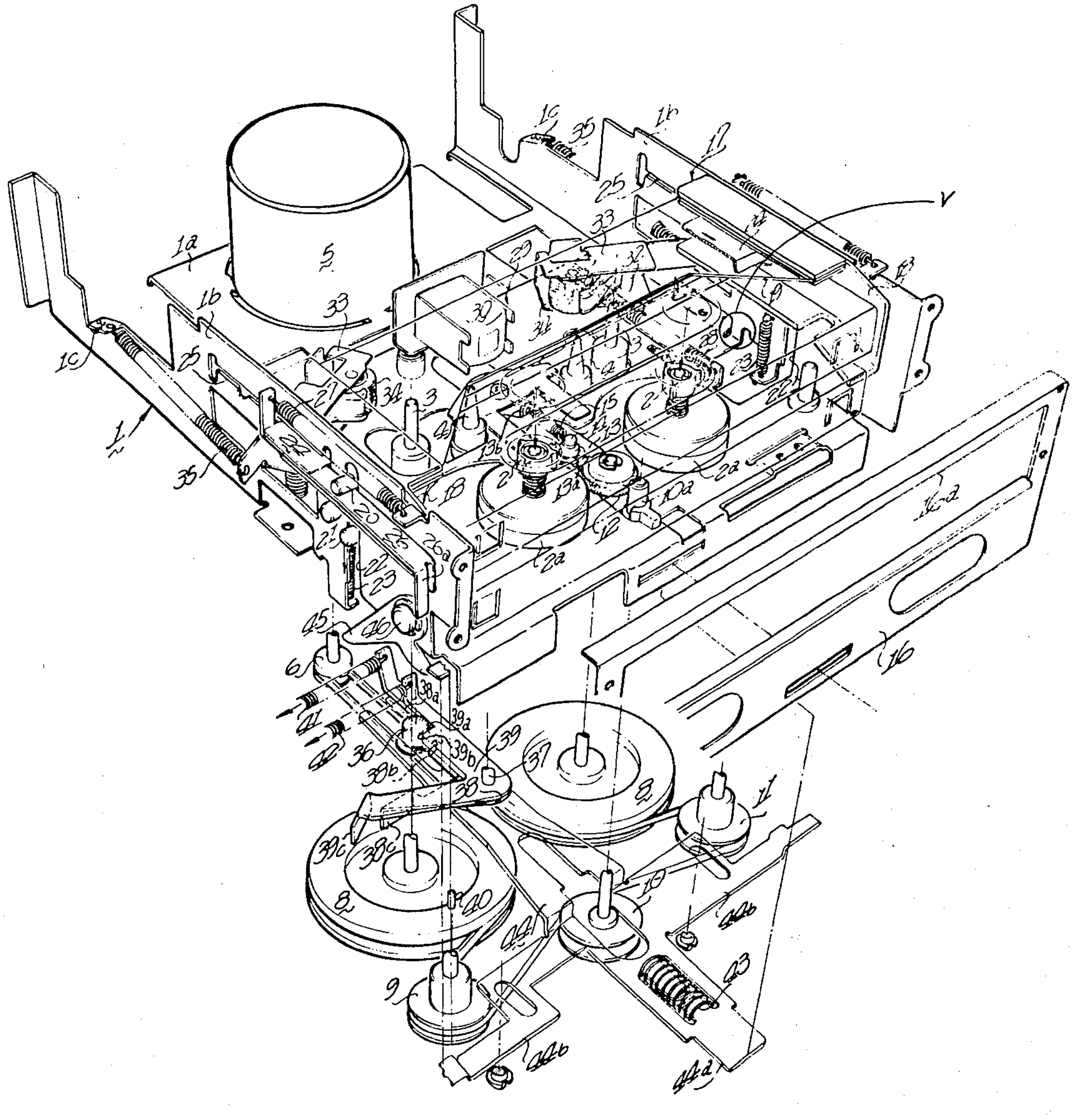
FIG. 1 is an exploded perspective view of the main portion of an illustrative cassette tape player constructed in accordance with the present invention.
Figure 2:
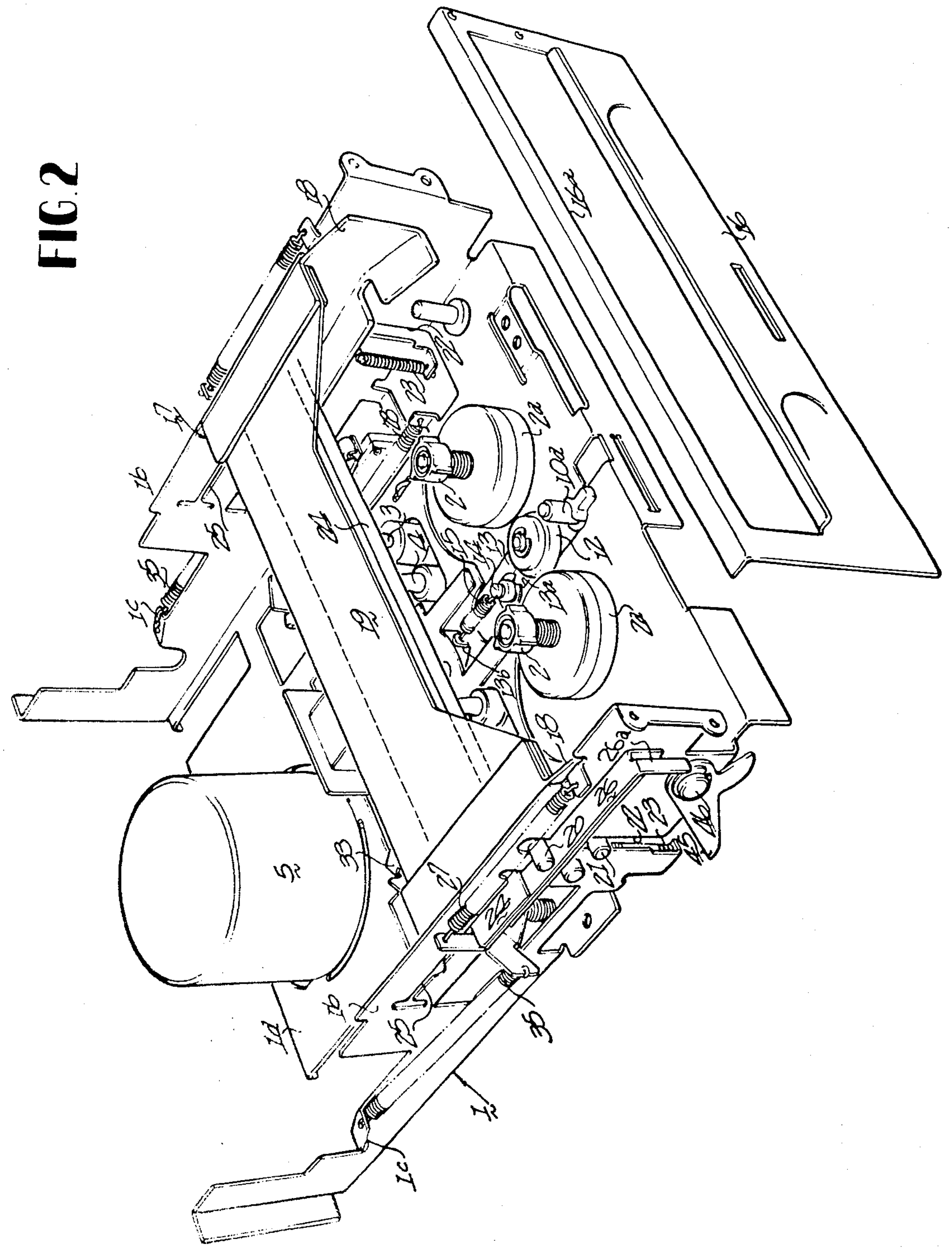
FIG. 2 is an exploded perspective view of the same illustrative embodiment as is shown in FIG. 1 with portions thereof removed for the sake of clarity.
Figure 3:
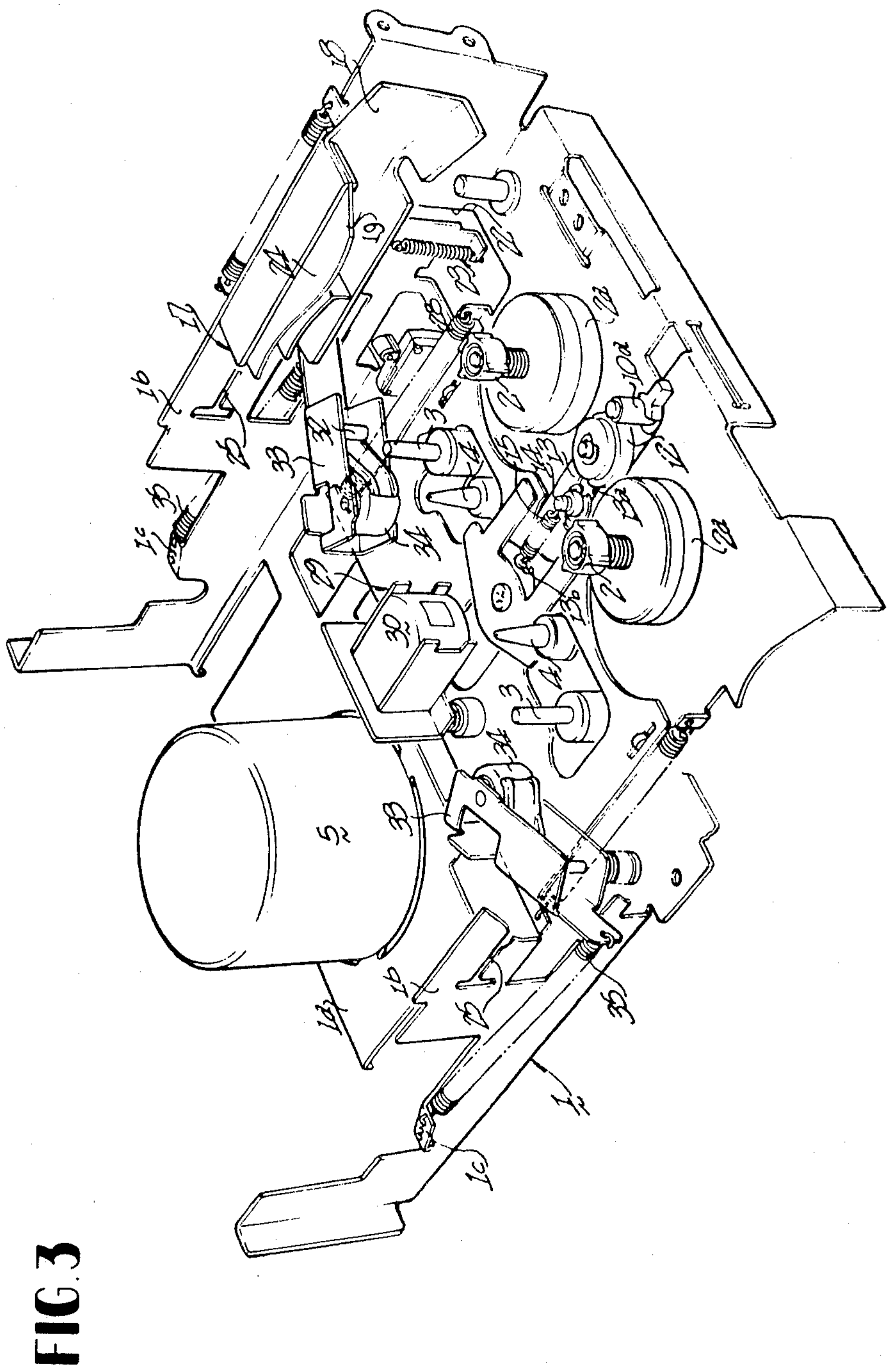
FIG. 3 is a perspective view of the same illustrative embodiment as is shown in FIGS. 1 and 2 with further portions thereof removed for the sake of clarity.
Figure 4:
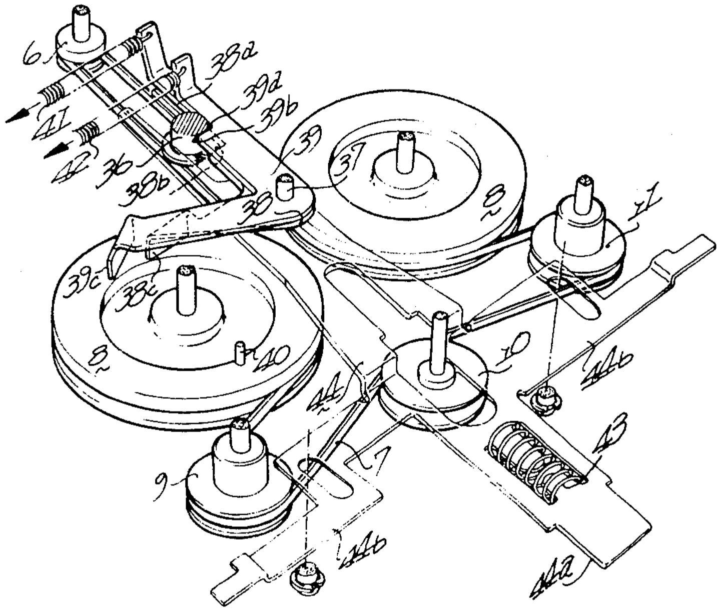
FIG. 4 is a perspective view of a portion of the illustrative embodiment shown in FIGS. 1–3.

Referring now to the drawings, the preferred embodiment of the present invention will be described. An illustrative cassette tape player includes a chassis 1 which comprises a bottom plate 1*a* and a pair of side plates 1*b* integral therewith. The bottom plate 1*a* supports rotatably a pair of reel shafts 2 and a pair of capstans 3 in a predetermined spatial relationship. A pair of guide pins 4 provided on the bottom plate 1*a* serve to define the set position of a tape cassette which will be moved down from an upper position. Thus, as the tape cassette moves down, the reel shafts 2 and 2 fit into corresponding reel center holes of the tape cassette while the capstans 3 and 3 pass through corresponding capstan insertion openings of the same.

In order to rotate the capstans 3 and 3 and the take-up reel shaft 2, an electric motor 5 is mounted on the bottom plate 1*a*. A pulley 6 secured to the rotary shaft of the motor 5 drives an endless belt 7 which loops from the pulley 6 through a fly-wheel 8 secured to one capstan 3, three pulleys 9, 10, and 11, another fly-wheel 8 secured to the other capstan 3, and back to the pulley 6. A rotary shaft 10*a* of the pulley 10 passes through the bottom plate 1a and projects thereabove, adjacent to an idler 12. The position of the rotary shaft 10*a* is selected so as to be spaced the same distance from both reel shafts 2 and 2, and the idler 12 is supported at one end of a lever 13 in the center between the periphery of a clutch mechanism 2*a* of one reel shaft 2 and the periphery of a clutch mechanism 2*a* of the other reel shaft 2. This lever 13 is supported by the bottom plate 1*a* through a pin 14 passing through an elongated hole 13*a* of the lever. In the state where the tape cassette is not inserted, the idler 12 is maintained in a position spaced from the rotary shaft 10*a* by engagement of an upturned piece 13*b* provided at the other end of the lever 13 with a carriage hereinafter described. After the tape cassette is inserted, however, by the action of a spring 15 connecting the upturned piece 13*b* and the pin 14, the idler 12 is moved and forced to abut upon the rotary shaft 10*a* with pressure. Under the urged-contact state of the idler 12, it comes to urged-contact with either clutch mechanism 2*a* depending upon the rotation direction of the rotary shaft 10*a*, whereby the rotation of the rotary shaft 10*a* is transferred through the idler 12 to one of the clutch mechanisms 2*a* for take-up. If the pulley 6 is rotated in the other direction to achieve reverse-reproduction, the idler 12 moves toward the opposite clutch mechanism 2*a* to rotate it.

The tape cassette may be inserted through an insertion opening 16*a* formed in a front plate 16 mounted to the side plates 1*b* in a direction perpendicular to the reel axis with the side of the tape cassette having a window where a magnetic tape is exposed being inserted first. After being inserted through the insertion opening 16*a*, the tape cassette is supported on an elevator deck 17. The elevator deck 17 has a pair of rails 18 adapted to engage upper and lower faces on either side of the tape cassette inserted through the insertion opening 16*a*, and intercoupling plates 19 for coupling the rails 18 and 18. The respective rails 18 and 18 are disposed inside the corresponding side plates 1*b* and 1*b*, and a pair of pins 20 and 21 provided on the outside face fit slidingly in an elongated hole 22 formed in the side plate 1*b*, which extends in a direction parallel to the axis of the reel shaft 2. Accordingly, the elevator deck 17 can move up and down between a first deck position where the tape cassette supported by this deck is in a predetermined play position and a second deck position above the first deck position and, by a spring 23 connecting the rail 18 and the chassis 1, the deck is biased and normally maintained in the first deck position.

A plate-shape moving member 24 is provided so that, when the elevator deck 17 is in the first deck position, it abuts upon the front end of the tape cassette inserted through the insertion opening 16*a* along the rails 18. Both ends of the moving member 24 project outward through elongated holes 25 formed in the side plates 1*b* extending in parallel with the rails 18, and this projecting end has a plate-shape limiting member 26. Accordingly, the moving member 24 can move along the elongated hole 25 between a first position where it abuts the tape cassette when the tape cassette is inserted halfway along the rails 18 and a second position which it assumes when the tape cassette is completely inserted up to the end of the rail 18. By the action of a spring 27 connecting the limiting member 26 and the side plate 1*b*, the moving member 24 is biased and normally maintained in the first position.

Figure 5:
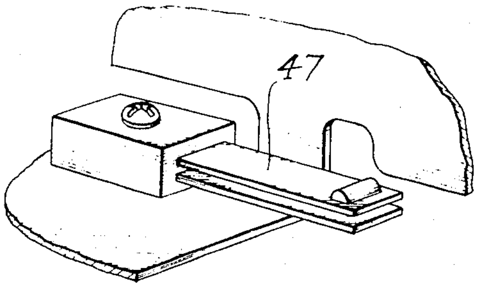
FIG. 5 is a blown up view of the portion of FIG. 1 contained within the circle V.

The major portion of the limiting plate 26 extends in parallel with the elongated hole 25 under the pin 20 of the rail 18, but one end is bent downward substantially rectangularly to form a bent portion 26*a*. Though the rail 18 is biased downward by the action of the spring 23, the limiting plate 26 located below the pin 20 prevents the pin 20 from moving down, so that the elevator deck 17 is maintained in the standby position. However, when the limiting plate 26 is moved from the first position to the second position by means of the tape cassette acting on the moving member 24, it ceases to support the pin 20, thereby permitting the elevator deck 17 to move down from the standby position to the operative position. Thus, the tape cassette's being inserted through the insertion opening 16*a* causes the moving member 24 to move from the first member position to the second member position while the tape cassette moves horizontally along the rail 18, and then the tape cassette moves down together with the elevator deck 17 to be set in the predetermined play position. In this state, the bent portion 26*a* of the limiting plate 26 abuts upon the side surface of the pin 20 to maintain the limiting plate 26 and the moving member 24 in the second position until the elevator deck 17 moves up to the standby position. When the elevator deck 17 moves down to the operative position, a switch 47 (shown in FIG. 5) operates to energize the motor 5.

A carriage 29 is supported on the bottom plate 1*a*, and it is movable between a first carriage position where it is close to the tape cassette in the play position and a second carriage position where it is remote from the tape cassette. It is normally biased by a spring 28 and maintained in the first carriage position. The carriage 29 carries a magnetic head 30 and a pair of pins 31, with each pin abutting upon an end of a support frame 33 pivotably supported by the bottom plate 1*a* through a vertical shaft 32. The support frame 33 supports rotatably a pinch roller 34, and its end projects outward through an opening formed in the side plate 1*b*. The pinch roller 34 is biased toward the capstan 3 by a spring 35 connecting the above projecting end and a tongue 1*c* integral with the side plate 1*b*. The tongue 1*c* has preferably a plurality of through holes so that, by selecting the through hole to which the spring 35 is coupled, the tension of the spring 35 can be adjusted. The pin 31 abutting upon the support frame 33 functions, when the carriage 29 is in the first carriage position, to permit pivoting of the support frame 33 so that the pinch roller 34 is urged toward the capstan 3 and, in the course of the carriage 29 moving from the first carriage position to the second carriage position, to force the support frame 33 to pivot in opposition to the spring 35 so that the pinch roller 34 is spaced away from the capstan 3. Further, when the carriage 29 moves from the first carriage position to the second carriage position, an engaging face provided in a portion of the carriage engages, as previously mentioned, the upturned piece 13*b* of the lever 13 to shift the lever 13 so that the idler 12 is spaced away from the rotary shaft 10*a*.

A pin 36 provided underside the carriage 29 projects downward through the bottom plate 1*a*, and within the moving path or route of the projecting end of the pin 36 a pair of cams 38 and 39 are disposed and supported by a pin 37. The first cam 38 is V-shaped and is pivotably supported at its apex by the pin 37. At one distal end of the cam 38 are formed a guide face 38*a*, which abuts the pin 36 and extends in a direction parallel to the moving direction of the pin 36, and an abutting face 38*b*, which extends in a direction perpendicular to the moving direction of the pin 36. The other distal end of the cam 38 has an engaging portion 38*c* located within the rotation path or route of a projection 40 formed on the upper surface of one of the fly-wheels 8. Similarly to the first cam 38, the second cam 39 has guide face 39*a*, abutting face 39*b*, and engaging portion 39*c*. The first and second cams 38 and 39 are biased by springs 41 and 42, respectively, so that the abutting faces 38*b* and 39*b* are in an urged —contact state with the periphery of the pin 36. The position of the abutting face 39*b* of the second cam 39 is selected in such a manner that it abuts upon the pin 36 when the carriage 29 is in the second carriage position spaced from the tape cassette. Thus, in this state, movement of the pin 36 is prevented by abuttment between it and the abutting face 39*b* of the second cam 39. Further, the position of the abutting face 38*b* of the first cam 38 is selected in such a manner that it is spaced from the portion of the pin 36 with which the abutting face 39*b* engages.

Further, the engaging portion 38*c* of the first cam 38 extends in a direction crossing the rotation path or route of the projection 40 in a manner that as the projection 40 moves backward with respect to the forward rotation direction (that is, the rotation direction occurring when the magnetic tape of the tape cassette runs forward), the engaging portion 38*c* comes close to the center of the fly-wheel 8. Thus, as the projection 40 rotates in the afore-mentioned direction, it abuts upon the front face of the engaging portion 38*c* and functions to push the engaging portion 38*c* away from the axial center of the fly-wheel 8. The engaging portion 39*c* of the second cam 39 is located in similar relation to the projection 40, but its position is selected behind the engaging portion 38*c* of the first cam 38 with respect to the forward rotation direction of the projection 40. Accordingly, when the projection 40 rotates in the forward direction, it abuts first upon the engaging portion 38*c* of the first cam 38 to rotate the first cam 38 in opposition to the spring 41 and then abuts upon the engaging portion 39*c* of the second cam 39 to rotate it in the same direction.

The motor 5 starts to rotate as soon as the tape cassette is set in the predetermined play position by the elevator deck 17, causing the pair of fly-wheels 8 and the three pulleys 9, 10, and 11 to rotate. However, because the idler 12 is at first spaced from the rotary shaft 10*a*, neither of the units comprising a clutch mechanism 2*a* and a reel shaft 2 begin to rotate immediately, and the magnetic tape does not advance. It should be noted that every time a new tape cassette is inserted the pulley 6 of the motor 5 is always rotated in the forward direction.

In response to rotation of the left-hand fly-wheel 8, the pin 40 provided on it rotates in the forward direction and abuts first upon the engaging portion 38*c* of the first cam 38, as described above, to cause the first cam 38 to rotate in the direction in which the abutting face 38*b* goes out of the moving path of the pin 36. However, because the abutting face 38*b* is spaced from the pin 36 when the pin 36 is in contact with the abutting face 39*b* of the second cam 39, the first cam 38 rotates freely and, after the projection 40 comes out of engagement with the engaging portion 38*c*, rotates reversely by the action of the spring 41 to return to the initial position, with the result that the guide face 38*a* again abuts upon the periphery of the pin 36.

Then, when the projection 40 abuts upon the abutting face 39*b* of the second cam 39 and continues to rotate further, the second cam 39 is rotated in opposition to the spring 42, and the abutting face 39*b* goes out of the moving path of the pin 36. However, because the abutting face 38*b* of the first cam 38 is on the moving path of the pin 36, the pin 36 is momentarily locked at this point. Then, when the projection 40 rotates about one revolution further to thereby rotate the first cam 38, the locking of the pin 36 is removed. As a result, the pin 36 can move freely, the carriage 29 is moved from the second carriage position to the first carriage position by the action of the spring 28, and the magnetic head 30 enters through the window of the tape cassette which has been maintained in the predetermined play position. At the same time, the support frame 33 is released from the pin 31 and rotated by the action of the spring 35 until the pinch roller 34 comes to urged-contact with the capstan 3. Thus, the magnetic tape is pinched at two points between capstans 3 and pinch rollers 34 and runs at a predetermined speed. Further, the lever 13, released because of movement of the carriage 29, is moved toward the rotary shaft 10*a* by the action of the spring 15, and the idler 12 fits in between the rotary shaft 10*a* and one of the clutch mechanisms 2*a*, thereby transferring the rotation of the rotary shaft 10*a* through the said clutch mechanism 2*a* to the related reel shaft 2. It should be noted that the pin 36 maintains the first and second cams 38 and 39 in the position where their engaging portions 38*c* and 39*c* are out of the rotation path of the projection 40 when the pin 36 reaches the first carriage position together with the carriage 29.

In order to take out the tape cassette set in the play position, an ejecting lever 44 is provided underside the bottom plate 1*a*. The lever 44 is movable in a direction parallel to the moving direction of the carriage 29 and biased in the same direction as that of the carriage 29 by a spring 43. This lever 44 operates to move the carriage 29 from the first carriage position to the second carriage position through the pin 36 engageable with the end of the lever 44 when it is pushed into the player in opposition to the spring 43 by depressing a push-button secured to its portion 44*a* projecting frontward beyond the front plate 16 of the chassis 1. When the carriage 29 reaches the second carriage position the pin 36 moves back behind the abutting faces 38*b* and 39*c* of the cams 38 and 39 to permit the cams 38 and 39 to return to their initial positions. After the above state is obtained, even if the lever 44 is released, the carriage 29 is maintained in the second carriage position because the movement of the pin 36 is prevented by the abutting faces 38*b* and 39*b* of the cams 38 and 39. Further, when the cams 38 and 39 return to the initial positions, even if the projection 40 abuts upon the engaging portions 38*c* or 39*c*, the complementary cam 39 or 38 returns to their initial positions, so that the condition that the carriage 29 does not lock in the second carriage position could not occur. If the projection 40 does happen to abut one of the engaging portions 38*c* or 39*c* when the pin 36 is moved, the pin 36 is not released until the fly-wheel 8 completes at least about one revolution.

The lever 44 has link portions 44*b* extending on either side in the direction normal to the moving direction thereof and in the plane of the cassette tape. The ends of the link portions 44*b* project outward passing underside the side plates 1*b*. The side plate 1*b* supports pivotably an arm 45 by means of a pin 46, which will be pivoted when the lever 44 is pushed by the action of the end of the link portion 44*b*. A distal end of the arm 45 is disposed so as to abut upon the lower surface of the pin 21 provided on the rail 18.

Thus, when the lever 44 is pushed, the carriage 29 moves backward a little and the magnetic head 30 comes out of the window of the tape cassette, whereas the distal end of the arm 45 pushes the pin 21 up along the surface of the bent portion 26*a* of the limiting plate 26 after the pinch roller 34 comes out of engagement with the capstan 3. As a result, the elevator deck 17 starts to move up from the first deck position. When the deck reaches the second deck position, the pin 20 disengages with the upper end of the bend portion 26*a* of the limiting plate 26 to thereby permit the limiting plate 26 to advance together with the moving member 24 due to the action of the spring 27. In response to the forward movement of the moving member 24, the tape cassette is ejected through the insertion opening along the rails 18, and the limiting plate 26, having resumed its initial position, abuts upon the lower surface of the pin 20 of the rail 18 to maintain the elevator deck 17 in the second deck position.

As described hereinabove, according to the present invention, after the tape cassette is set in the predetermined play position and the time necessary for the fly-wheel 8 to rotate at least about one revolution has elapsed, the carriage 29 can move forward, and the magnetic head 30 and the pinch roller 34 are shifted to the predetermined position. Thus, the danger that the magnetic head 30 or pinch roller 34 may strike against the case of the tape cassette, which is present if the carriage starts to move forward before the cassette has been set in the proper position, is completely obviated. Further, because a pair of cams 38 and 39 are provided, the projection 40 engageable with the cams can lock the carriage 29 irrespective of its position, resulting in a remarkably improved stability of operation. Moreover, when the carriage 29 is to move forward, the fly-wheels 8 and capstans 3 have rotated at least one revolution and have reached their operating speeds, thus ensuring that the start-up of the magnetic tape is rapid, providing a good start-up character for the player.

CAVEAT

While this invention has been illustrated by a detailed description of a preferred embodiment thereof, it will be obvious to those skilled in the art that various changes in form and detail can be made therein without departing from the true scope of the invention. Accordingly, the scope of the subject matter claimed must be determined from the following claims and not solely from examination of the foregoing description.

What is claimed is:

1. A start-up mechanism for a cassette tape player having a holder mechanism for holding a tape cassette in a predetermined play position, a magnetic head, and a motor for feeding tape in a tape cassette held by said holder mechanism, said start-up mechanism comprising:

1. a capstan;
2. means connecting said motor to said capstan for driving said capstan in rotation;
3. a fly-wheel connected to said capstan and adapted to be rotated therewith;
4. a projection provided on said fly-wheel;
5. a carriage movable in said cassette tape player between a first carriage position in which said magnetic head is close to the tape in a tape cassette positioned in the play position and a second carriage position in which said magnetic head is spaced from the tape in a tape cassette positioned in the play position;
6. means for biasing said carriage towards the first carriage position;
7. a pin provided on said carriage; and
8. a first cam adapted to engage said pin, thereby forcing said carriage from its first to its second position, said first cam having an abutting face located in the path of said pin when said carriage is moved between its first and second position and an engaging portion which may be moved into the path of said projection, said engaging portion being shaped so that when it is pushed out of the path of said projection by the rotational motion thereof, the abutting face of said first cam is caused to move out of the path of said pin, whereby said carriage may be moved from its second carriage position to its first carriage position solely by the rotational power of said fly-wheel, which rotational power acts on said carriage via said projection, said first cam, and said pin.

2. A start-up mechanism for a cassette tape player as claimed in claim 1 and additionally comprising a second cam, said second cam having a. an abutting face located in the path of said pin when said carriage is moved between its first and second positions at a point ahead of the abutting face of said first cam with respect to the direction of rotation of said projection, and b. an engaging portion which may be moved into the path of said projection at a point behind the engaging portion of said first cam, likewise with respect to the direction of rotation of said projection.

3. A start-up mechanism for a cassette tape player as claimed in claim 1 and additionally comprising:

1. an elevator deck for supporting a tape cassette inserted into said cassette tape player, said elecator deck being movable between an operative position in which the tape cassette is held by said holder mechanism and a standby position spaced from said first deck position;
2. a moving member adapted to abut the first-inserted end of the tape cassette and, in ressponse to the insertion thereof, to be moved from a first position to a second position; and
3. a limiting plate adapted to maintain said elevator deck in its standby position when said moving member is in its first position and to permit said elevator deck to move to its operative position when said moving member is moved to its second position.

4. A start-up mechanism for a cassette tape player as claimed in claim 3 and additionally comprising a switch connected to said motor and to said elevator deck so that said motor operates only when said elevator deck is in its first position.

5. A start-up mechanism for a cassette tape player as claimed in claim 1 and additionally comprising a second cam, said second cam having a. an abutting face located in the path of said pin when said carriage is moved between its first and second positions at a point ahead of the abutting face of said first cam with respect to the direction of rotation of said projection, and b. an engaging portion which may be moved into the path of said projection at a point behind the engaging portion of said first cam, likewise with respect to the direction of rotation of said projection.

* * * * *